(12) United States Patent
McMullen et al.

(10) Patent No.: US 7,698,062 B1
(45) Date of Patent: Apr. 13, 2010

(54) MOST CONVENIENT POINT OF INTEREST FINDER APPARATUS AND METHOD

(75) Inventors: Michael P. McMullen, Leawood, KS (US); Peter H. Distler, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1128 days.

(21) Appl. No.: 11/332,187

(22) Filed: Jan. 12, 2006

(51) Int. Cl.
*G08G 1/123* (2006.01)
(52) U.S. Cl. .................................. 701/211; 342/357.13
(58) Field of Classification Search ......... 701/200–202, 701/207–209, 211–215; 340/995.13, 988; 342/357.01, 357.06, 357.13
See application file for complete search history.

(56) References Cited

U.S. PATENT DOCUMENTS

| | | | |
|---|---|---|---|
| 5,648,768 A * | 7/1997 | Bouve | 340/988 |
| 6,202,023 B1 | 3/2001 | Hancock et al. | 701/201 |
| 6,374,180 B1 * | 4/2002 | Slominski et al. | 701/208 |
| 6,542,814 B2 * | 4/2003 | Polidi et al. | 701/208 |
| 6,552,682 B1 * | 4/2003 | Fan | 342/357.09 |
| 6,751,550 B2 | 6/2004 | Niitsuma | 701/210 |
| 6,839,628 B1 * | 1/2005 | Tu | 701/209 |

* cited by examiner

*Primary Examiner*—Dalena Tran

(57) ABSTRACT

Methods and systems are disclosed for finding a most convenient point of interest for a traveler traveling along a route to a destination. The method includes the steps of identifying the location of the traveler, receiving one or more traveler-specified convenience criteria (e.g., maximum distance or time off-route to arrive at the point of interest); receiving a traveler-specified type of point of interest (e.g., hotel, sporting goods store, ice cream parlor) indicating the type of point of interest the traveler wishes to go to while traveling to the destination; searching through a database containing points of interests and their locations for points of interest of the type specified by the traveler meeting the traveler-specified convenience criteria; and providing instructions to the traveler to travel to at least one of the points of interest identified in the searching step if the searching step resulted in finding at least one point of interest meeting the convenience criteria.

21 Claims, 3 Drawing Sheets

MOST CONVENIENT POINT OF INTEREST FINDER APPARATUS AND METHOD

BACKGROUND

1. Field

This disclosure relates generally to the field of navigation and driving direction applications and related systems, and more particularly to a method for assisting in identifying and directing a traveler to a point of interest which is most convenient, in accordance with traveler-specified convenience criteria. Such point of interest might be a hotel to stay the night, a restaurant, a gas station, or other type of facility of interest to the traveler.

2. Description of Related Art

Navigation systems are currently offered on the market which combine geolocation capability (e.g. using a GPS satellite receiver) along with a mapping database. Such systems can be programmed to provide driving directions, whereby a person merely has to enter the address of the destination in order to receive driving directions. Such systems may provide driving directions by way of a graphical display, by verbal prompts ("turn right on Highway 12") or by a combination of the two.

The art has also developed systems for providing directions to mobile units (e.g., delivery trucks) using the communications capabilities of wireless communications networks, such as CDMA cellular telephony networks. Prior art of interest includes Hancock, U.S. Pat. No. 6,202,023 and Niitsuma, U.S. Pat. No. 6,751,550.

The situation may arise where a traveler is en route to a destination and would like to stop along the way, either to eat, buy something, sleep, get gas, visit a park or church, or stop at some other type of point of interest. The situation frequently arises where the traveler wants to minimize the amount of travel time or distance off of their route to get to the point of interest. Or, the traveler may determine that they want to stop at the point of interest (e.g., restaurant) at some specified time in the future, say in two hours time, rather than the first restaurant they come to. This disclosure provides methods by which a point of interest that is most convenient to the traveler is identified, where the user able to set the parameters as to convenience, such as how far off their route they are willing to travel, or how much time they are willing to elapse before they arrive at the point of interest.

SUMMARY

The following embodiments and aspects thereof are described and illustrated in conjunction with systems, tools and methods which are meant to be exemplary and illustrative, not limiting in scope. In various embodiments one or more of the above-described problems have been reduced or eliminated, while other embodiments are directed to other improvements In one aspect, this disclosure provides for a method of identifying a most convenient point of interest for a traveler traveling along a route to a destination. The method includes the steps of identifying the location of the traveler (e.g., using a GPS receiver that is with the traveler or in the traveler's vehicle) and receiving one or more traveler-specified convenience criteria. Such convenience criteria can take a variety of forms such as (a) the maximum desired travel distance off a previously determined route to the destination to reach the point of interest, (b) the soonest desired time to reach the point of interest, (c) the maximum travel time off a previously determined route to the destination to reach the point of interest; (d) the maximum amount of desired time before the point of interest is reached, and (e) the maximum distance traveled before the point of interest is reached. Other convenience criteria could include a minimum distance or time to travel on the route before the point of interest is reached, and that a certain landmark or intersection along the route is reached before the point of interest is reached.

The method further includes a step of receiving a traveler-specified type of point of interest indicating the type of point of interest the traveler wishes to go to while traveling to the destination. For example, the traveler may specify that they want to go to an ice cream parlor, sporting goods store, bank, or other type of point of interest. The method further includes a step of searching through a database containing points of interests and their locations, for points of interest of the type specified by the traveler meeting the traveler-specified convenience criteria. For example, among 3 different ice cream parlors that are near the route the traveler is on, one of the three meets the traveler-specified convenience criteria of a) being less than one half mile off of the route and b) the traveler will reach the ice cream parlor within the next hour. The other two ice cream parlors do not meet the criteria in that they are either more than one half mile off of the route or the traveler will not reach them within the next hour.

The searching step could be performed locally, e.g., in a vehicle navigation system having a map database containing points of interest which is installed in the vehicle the traveler is driving in. Alternatively, the searching step can be done remotely, e.g., in a network server that communications with the traveler over a wireless communications network such as a cellular telephony network.

The method further includes the step of providing instructions to the traveler to travel to at least one of the points of interest identified in the searching step if the searching step resulted in finding at least one point of interest meeting the convenience criteria. Such instructions could be provided on the display of the navigation system. Alternatively, the instructions could be displayed on a wireless communications device (e.g. cell phone or laptop computer) that the traveler uses to communicate with a remotely located network server, or they could be provided as driving directions in the form of speech via the traveler's cell phone.

In one possible embodiment, the searching for the most convenient point of interest may make use of speed limit data for roads stored in a map database. In particular, the method may further include the steps of determining the speed limit for road segments on the route from the current location of the traveler to the destination, and off-route road segments to points of interest, and using the speed limits to compute travel times from the current location of the traveler to points of interest in the database of the type identified by the traveler; and using the travel times to select a points of interest in the database meeting the convenience criteria. For example, if the traveler has specified that they do not want to travel more than 2 hours before they reach the point of interest, the searching step may compute travel times along the route (and any off-route segments to reach the point of interest) by assuming the traveler travels at the speed limit, and thereby computes total driving time to points of interest. The computation of total driving time may take into account actual traffic flow rates, using real time data obtained from the Department of Transportation of the state where the route is located, or other source. The selection of the most convenient point of interest then is based on the criteria of less than two hours, and the computed total driving time to points of interest, and selection of those points of interest that meet the criteria of less than two hours.

There may be situations where more than one point of interest is found that meets the convenience criteria. In that situation, the traveler is presented with a list of all the points of interest meeting the convenience criteria and is prompted to select one, and then driving directions are provided to the one selected by the traveler. The list may be presented to the user in a variety of fashions, such as in order of "most convenient", second most convenient, etc. with the points of interest ranked by distance and/or time off-route. Such a list could include the point of interest name, the distance off route, the off-route travel time, and the total distance from the current location. With this data displayed to the user, the user can whether one point of interest (say five minutes off route but 45 minutes away) with another (say, seven minutes off route but 20 minutes away). In cases where the off route time is the same, then the precedence for display would be listing the closest point of interest first.

In the event that the search for a most convenient point of interest did not result in any "hits", then the user is prompted to re-enter their convenience criteria. The user may be prompted to increase the off-route travel time, increase the off-route travel distance, increase or decrease the time to reach the point of interest, or other criteria.

In one embodiment, the most convenient point of interest finder feature is implemented in an on-board navigation system installed in the traveler's vehicle. Such a system includes a map database containing points of interests and their locations, a data processing unit, a user interface for receiving input information from the traveler and providing a graphical and/or audible means for providing driving directions to the traveler; and a means for determining the current location of a vehicle in which the navigation system is installed (e.g., a global positioning system (GPS) satellite receiver).

The system further includes a set of instructions stored in memory in the navigation system comprising a most convenient point of interest routine for execution by the processor. The most convenient point of interest routing comprises instructions for: (a) receiving via the user interface one or more traveler-specified convenience criteria pertaining to a point of interest the traveler wishes to go to while traveling to a destination; (b) receiving a traveler-specified type of point of interest indicating the type of point of interest the traveler wishes to go to while traveling to the destination (e.g., bank, grocery store, hotel, etc.); and (c) searching through the map database for locations of points of interest of the type specified by the traveler meeting the traveler-specified convenience criteria. The user interface of the navigation system provides driving directions graphically and/or audibly to the traveler providing instructions to the traveler to travel to at least one of the points of interest identified in the searching step if the searching step resulted in finding at least one point of interest in the database meeting the convenience criteria.

In another embodiment, the traveler may communicate with a remotely located system which identifies most convenient point of interest for the traveler. In this embodiment, the system provides driving instructions to a traveler via the traveler's wireless communications device (e.g., cellular telephone) to direct the traveler to a most convenient point of interest. The system, which in one embodiment is managed by a wireless service provider providing wireless services to the traveler, includes a map database and a navigation server responsive to queries from the traveler for directions to a most convenient point of interest. The navigation server communicates with the traveler via a wireless communications network, e.g., a CDMA wireless network, WIFI, WIMAX or other technique. The navigation server includes a data processing unit and a set of instructions comprising a most convenient point of interest routine for execution by the data processing unit. The most convenient point of interest routine includes instructions for: (a) receiving one or more traveler-specified convenience criteria pertaining to a point of interest the traveler wishes to go to while traveling to the destination; (b) receiving a traveler-specified type of point of interest indicating the type of point of interest the traveler wishes to go to while traveling to the destination; and (c) searching through the map database for locations of points of interest of the type specified by the traveler meeting the traveler-specified convenience criteria.

The driving directions to the point of interest meeting the traveler-specified convenience criteria could be provided on the traveler's cell phone (e.g. in the form of speech, text listing driving directions, or a map), or such directions could be ported from the cell phone to a local navigation system in the traveler's vehicle and provided on the display of the local navigation system.

DETAILED DESCRIPTION OF PREFERRED EMBODIMENTS

Figure 1:
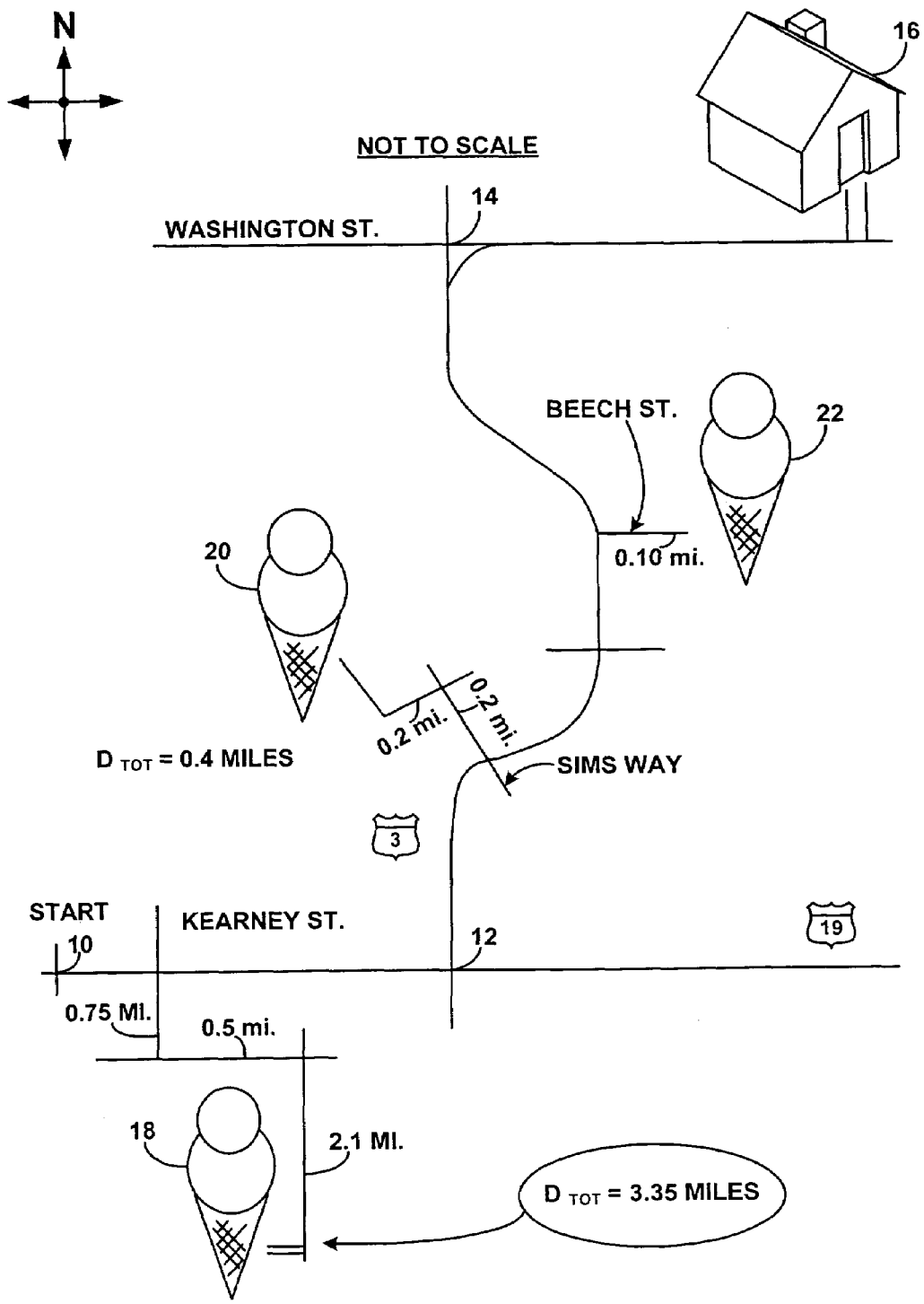
FIG. 1 is an illustration of a travel route and three points of interest along the way (ice cream parlors indicated by the ice cream cones). The methods of this disclosure select one of the ice cream parlors as being most convenient for the traveler based on traveler-specified convenience criteria, such as for example the maximum distance off of their route they are willing to travel to reach the ice cream parlor or the amount of time to elapse before they arrive at the ice cream parlor.

This disclosure provides for methods of identifying the most convenient point of interest to a traveler that is traveling along a route to a destination. The methods of the invention will be illustrated by way of example with reference to FIG. 1. This figure is is an illustration of a travel route from a starting position 10 of the traveler to a destination 16. The travel route from the starting point 10 is east on Highway 19 to the intersection 12 with Highway 3, North on Highway 3 to Washington Street (14), and east on Washington Street to the destination 16. Assume in this example that the traveler wishes to stop at an ice cream parlor en route to the destination.

It so happens that there are three ice cream parlors indicated by the ice cream cones 18, 20 and 22 that are roughly on the way, but all of them are off-route, i.e., none of them are on either Highway 19, Highway 3 or Washington Street. The methods of this disclosure provide a way of selecting one (or possible more than one) of the ice cream parlors as being the most convenient for the traveler based on traveler-specified convenience criteria, such as for example the maximum distance off of their route they are willing to travel to reach the ice cream parlor or the amount of time to elapse before they arrive at the ice cream parlor. For example, the traveler may specify that they wish to travel no more than 0.2 miles off their route to reach the ice cream parlor, in which case ice cream parlor 22 is selected and the traveler given driving directions to reach parlor 22. As another example, the traveler may indicate that they do not want to arrive at the ice cream parlor any earlier than one hour and no later than two hours, and are willing to drive up to 1 mile off route to reach the parlor. Ice cream parlor 20 meets these criteria. As another example, the user could specify a convenience criteria that they wish to arrive at the ice cream parlor within 1 hour and are willing to travel off-route up to 4 miles to reach it, in which case ice cream parlor 18 satisfies the criteria, but ice cream parlors 20 and 22 do not. As another example, the criteria specified could be that the user wishes to travel at least 40 miles along the route until the destination is reached, in which case parlor 22 satisfies the criteria by parlors 18 and 20 do not.

In one form of the invention, the method includes steps of identifying the location of the traveler. Such location can be determined in a variety of ways such as by means of a GPS receiver that is used by the traveler or incorporated into a navigation system in the car the traveler is driving. Such location could also be determined by means of triangulation algorithms applied to cellular telephony communications between the traveler and base transceiver stations in a cellular telephone network, in accordance with known prior art techniques.

The method further includes steps of receiving one or more traveler-specified convenience criteria. Such convenience criteria could be entered into a navigation system installed in the traveler's vehicle or communicated over a wireless network to a navigation server maintained on a land-based network (e.g., in a wireless service provider backbone network). The method further includes the step of receiving a traveler-specified type of point of interest indicating the type of point of interest the traveler wishes to go to while traveling to the destination, e.g., hotel, ice cream parlor, bank, etc.

The method further includes a step of searching through a map database containing points of interests and their locations for points of interest of the type specified by the traveler meeting the traveler-specified convenience criteria. Such searching could be carried out by a processing unit in the local navigation system in the traveler's vehicle, or by the navigation server in the wireless service provider network. Such searching could identify for example ice cream parlor 20 as meeting the convenience criteria of off-route distance of less than one mile and arrival at the ice cream parlor after one hour has elapsed but before two hours has elapsed (the route between Sims way and Beech street on Highway 3, and the distance from the start 10 to the parlor 20 being such that the traveler would not reach the parlor 22 until after 2 hours has elapsed).

The method further includes a step of providing instructions to the traveler to travel to at least one of the points of interest identified in the searching step if the searching step resulted in finding at least one point of interest meeting the convenience criteria. For example, driving directions could be displayed on the navigation system user interface display prompting the driver to take the route to the ice cream parlor 18, 20, or 22.

The nature or type of convenience criteria that may be specified by the traveler is configurable depending on the features that the provider of the most convenient point of interest finder wishes to provide. Examples include (a) the maximum desired travel distance off a previously determined route to the destination to reach the point of interest, (b) the soonest desired time to reach the point of interest, (c) the maximum travel time off a previously determined route to the destination to reach the point of interest; (d) the maximum amount of desired time before the point of interest is reached, and (e) the maximum distance traveled before the point of interest is reached. Other criteria could be a landmark or intersection along the route must be reached first, or that the user travel along the route some minimum distance before the point of interest is reached. Preferably the traveler can specify parameters of at least one, and preferably more than one, of these criteria.

In the event that the searching step does not identify any points of interest meeting the convenience criteria, the method includes the step of prompting the user to reenter new convenience criteria, such as enlarging the distance or time they are willing to travel off-route to arrive at the point of interest, or enlarging the window of time in which they wish to arrive at the point of interest.

In order to determine which point of interest is most convenient from a time perspective (i.e., in the event that the traveler has specified a time element in the convenience criteria), the system implementing the invention preferably uses a map database that includes speed limit data for roads along the route and any roads off-route that lead to the point of interest. The system then uses such speed limits to compute travel times from the current location of the traveler to points of interest in the database, with the assumption that the traveler travels at the speed limit along the route. Alternatively, the system could obtain real-time traffic flow data (e.g. from the state Department of Transportation where the route is one for which such data is available). The system then uses the travel times (either theoretical or actual) to select a point of interest in the database meeting the convenience criteria. For example, the system determines that off-route travel time to three points of interests are 4 minutes, 10 minutes and 25 minutes, respectively. If the traveler specified that they wished to travel no more than five minutes off their route the reach the point of interest, only the first point of interest with the 4 minute travel time would be selected as a most convenient point of interest.

Figure 2:
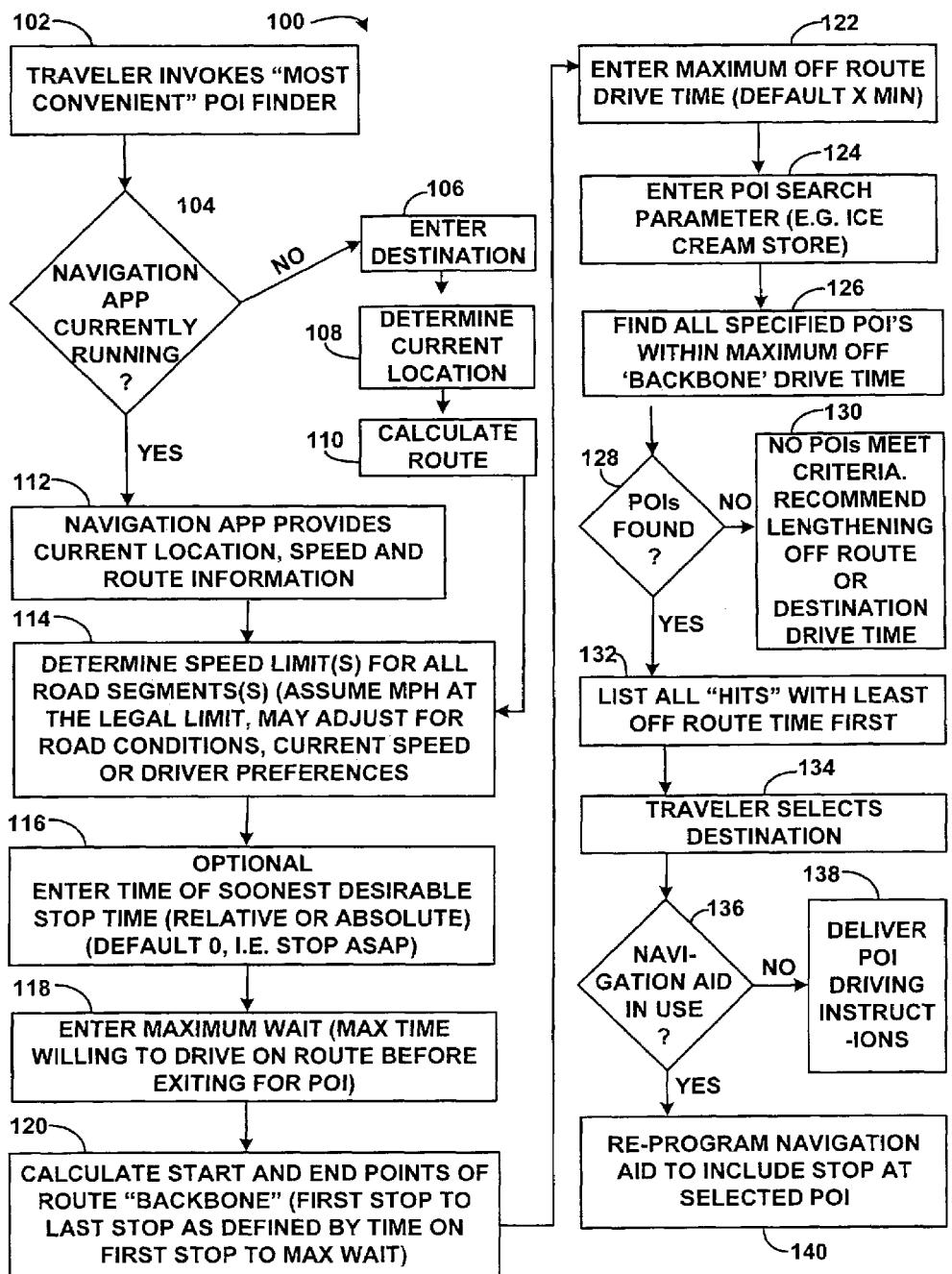
FIG. 2 is a flow chart showing one possible most convenient point of interest routine including a sequence of steps by which a most convenient point of interest is identified.

FIG. 2 is a flow chart showing a sequence of steps 100 by which a most convenient point of interest for a traveler is identified. Some of the steps involve steps executed by the traveler, such as entering convenience criteria, and other steps represent software processes that are executed by a processor that identifies a most convenient point of interest for the traveler. The processor could be resident in a on-board navigation system used by the traveler, or it could be resident on a network as described in FIG. 3 and described subsequently.

At step 102, the traveler invokes a "most convenient" point of interest (POI) finder feature. Such feature may be a software feature in a turn-by-turn navigation aid in the traveler's vehicle (e.g., NeverLost™ system found in Hertz rental cars or a navigation system provided as original OEM equipment in the car, or an off-the shelf navigation system purchased as an accessory for the vehicle). In one possible embodiment, the traveler has a portable computing device equipped with a cellular telephone antenna and a navigation application providing driving directions, and the user launches a most convenient point of interest feature in the navigation application. Still other variations are possible.

At step 104, a check is made to determine whether a navigation application is running. If no, the processing branches to step 106 wherein the user enters the address of the destination (FIG. 1, address of house 16), the navigation system determines the current locations at step 108 (via GPS receiver in the navigation system) and at step 110 the route from the current location 10 to the destination 16 is calculated.

At step 104, if the navigation application is currently running (i.e., the destination already entered and the current location of the traveler or the traveler's vehicle known), the processing proceeds to step 112. At step 112, the navigation application provides to the most convenient point of interest routine the current location, the speed of the vehicle, and the route information.

At step 114, the process determines the speed limit for all road segments along the route from the current location of the traveler and the destination. Such information is obtained by query of a map database. The map database stores data on points of interest and their locations, data on roads, such as length between intersections, and data on speed limits along the roads. The speed limit by be adjusted for road conditions, (e.g., congestion, time of day, road construction, weather conditions, snow or ice, etc.). Additionally, the speed limits could be adjusted by traveler-entered preferences, such as decrease speed limits by 5 mph. Step 114 may also invoke accessing real time traffic flow rate data, e.g. from a Department of Transportation web server, local news station web site, traffic report service agent, or other source where such information is available.

At step 116, the traveler is presented with an option of entering a convenience criteria related to stopping at a point of interest. The criteria at step 116 is the time of the soonest desirable stop time, a time which may be relative or absolute. For example a value of 0 might represent stop as soon as possible. A value of 60 would mean that the earliest the traveler wishes to stop is 60 minutes from now. This step may be performed for example by using a user interface keys or buttons provided on a navigation system in response to prompts appearing on the display of the navigation system.

At step 118, the traveler is presented with an option of entering a second convenience criteria related to stopping at a point of interest. The criteria at step 118 is the maximum wait time, that is, the maximum time the traveler wants to elapse before arriving at the point of interest. Still further convenience criteria could be entered at this point.

At step 120, the most convenient point of interest routine then calculates a start and end points of a "route backbone". The route backbone consists of a series of route segments along the route to the destination. The beginning of the route backbone is the current location of the traveler (if they had specified 0 minutes at step 116 or if step 116 was not performed) or some position along the route that is dictated by some non-zero entry at step 116. For example if the traveler had specified 30 minutes at step 116, the beginning of the route backbone would be the position along the route where the traveler would be expected to be in 30 minutes, assuming they travel at the speed limit. The end of the route backbone is the place along the route where the traveler is expected to be given the time entered at step 118. For example, if the traveler entered 120 minutes at step 118, the end position on the route backbone would be the position on the route where the traveler would be expected to be if they travel along the route at the speed limit for two hours.

At step 122, the traveler is prompted to enter maximum off-route drive time they are willing to accommodate in order to arrive at a point of interest that is off the route. A default value of X minutes may be used in one possible embodiment, where X is a configurable parameter. The step 122 may be performed by prompting the traveler to enter a maximum off-route drive distance instead of or in addition to off-route drive time.

At step 122, the traveler enters the point of interest search parameter indicating the type of point of interest they wish to stop at, e.g., gas station, hotel, ice cream store, bank, etc.

It will be appreciated that steps 116, 118, 120, 122 and 124 need not be performed in any particular order. Moreover the user may be provided with a single screen display the steps of entering convenience criteria and type of point of interest are combined in a single user interface data entry event.

At step 126, a processing step is performed by which a processing unit access a map database and identifies all point of interests in the vicinity of the backbone route determined at step 120 which meet the traveler's convenience criteria entered at steps 116, 118, 122 and 124 (and possibly other criteria). The searching may be performed with the aid of speed limit data in the map database to calculate travel times off-route to points of interest in the vicinity of the "route backbone." With reference to FIG. 1, suppose that the route backbone starts at location 10 and ends at the intersection of Washington Street and Highway 3 (point 14), and that the mapping database stores locations of ice cream parlors 18, 20 and 22. If the traveler specified that they did not want to travel off-route for more than 2 minutes, the search step 126 locates ice cream parlors 20 and 22 (given speed limits on the off-route legs from Highway 3 to the parlors 20 and 22.) Processing step 126 can be done by a processor in the local navigation device the traveler is using or in the network server on one possible embodiment.

At step 128 a check is made as to whether any point of interests were found that meet the convenience criteria. If at step 128 no point of interests are returned, the traveler is provided with a prompt to re-enter their convenience criteria at step 130. Such message could be one such as "No points of interest meeting your convenience criteria were found. You should re-enter your criteria but lengthen the off-route drive time (or distance) or the maximum wait time."

At step 132, if at least one point of interest is found, the point of interest is presented to the user on the navigation device. If more than one point of interest is found, then they are all listed, with the one with the shortest off-route drive time listed first. The user is then prompted to select which one they wish to use.

At step 134, the traveler makes a selection of the point of interest, e.g., using the key pad or buttons of the navigation system, scrolling down to the point of interest and tapping the "enter" button, or other appropriate action.

At step 136, the application checks with the navigation application to see if it is in use (i.e., booted up, with the final destination entered, and current position of the traveler logged). If the navigation application is not currently in use, at step 138 the application is launched and the most convenient point of interest finder application delivers the point of interest selected by the traveler to the application and the application then renders driving instructions to the traveler to take them to the selected most convenient point of interest. If at step 136 the navigation application is in use, the selected point of interest is provided to the navigation application and the navigation application is reprogrammed to include the stop at the selected most convenient point of interest. In a typically embodiment, the navigation application would re-calculate the route to include the point of interest as being on the route to the destination.

On-Board Navigation System Embodiment

In one embodiment, the invention is practiced in a navigation system providing driving directions to a traveler, such as an OEM or aftermarket driving aid system. Such a system includes a map database containing points of interests and their locations, and a data processing unit, as is well known in the navigation system art. The system further includes a user interface, e.g., keypad or buttons, for receiving input information from the traveler and providing a graphical and/or audible means for providing driving directions to the traveler. The system further includes a means for determining the current location of a vehicle in which the navigation system is installed, such as by including in the system a GPS receiver that is coupled to the processing unit.

The system further includes a set of software instructions stored in memory in the navigation system comprising a most convenient point of interest routine for execution by the processor. One example of the processing steps of such routine is shown in FIG. 2. The most convenient point of interest instructions receive via the user interface one or more traveler-specified convenience criteria pertaining to a point of interest the traveler wishes to go to while traveling to a destination (steps 116, 118 of FIG. 2 and possibly others); instructions receiving a traveler-specified type of point of interest indicating the type of point of interest the traveler wishes to go to while traveling to the destination (step 124 of FIG. 2); and instructions for searching through the map database for locations of points of interest of the type specified by the traveler meeting the traveler-specified convenience criteria (step 126 of FIG. 2). The user interface of the navigation provides driving directions graphically and/or audibly to the traveler providing instructions to the traveler to travel to at least one of the points of interest identified in the searching step if the searching step resulted in finding at least one point of interest in the database meeting the convenience criteria (steps 138 and 140 of FIG. 2).

Network Navigation Server Embodiment

In another possible implementation, the most convenient point of interest finder routine of FIG. 2 is implemented with the aid of a network server. Driving directions to the most convenient point of interest are relayed to the traveler via a wireless communications system and displayed on a cell phone or other wireless device communicating with the network server.

Figure 3:
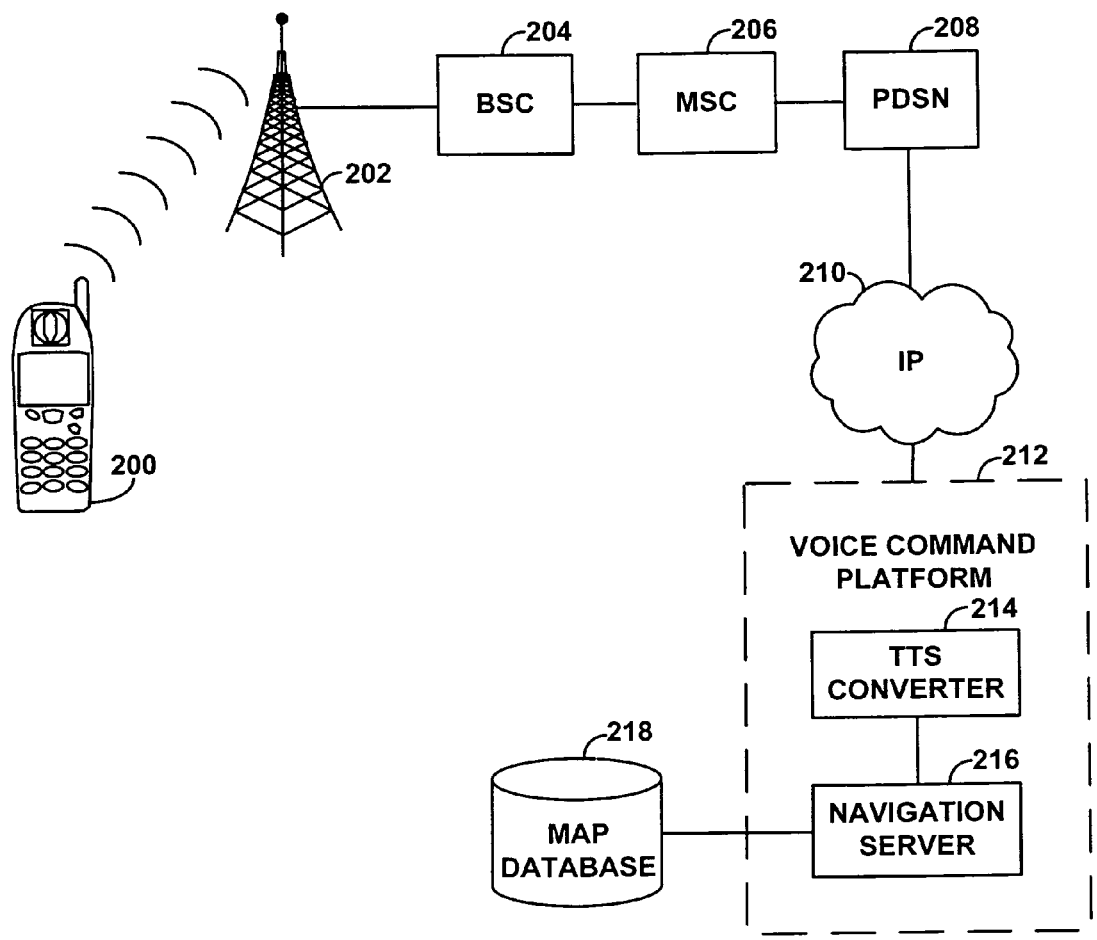
FIG. 3 is an illustration of a wireless communication network and a navigation server which identifies a most convenient point of interest and provides driving directions to the traveler via cellular communications to the traveler's cell phone.

FIG. 3 is an illustration of a wireless communication network infrastructure and a navigation server which identifies a most convenient point of interest and provides driving directions to the traveler via cellular communications to the traveler's cell phone 200. The cellular phone 200 communicates in a bi-directional fashion with a base transceiver station 202. The wireless network infrastructure include a base station controller 204, mobile switching center 205 and packet data servicing node 208, which are all known in the art of CDMA cellular telephony. The packet data serving node 208 is coupled to a packet-switched Internet Protocol network 210, which may be for example a wireless service provider backbone network. The wireless service provider operates a voice command platform 212 which includes a text to speech and speech to text converter 214 which translates between voice and text formats, and a navigation server 216 which is in communication with a map database 218. The map database 218 includes location information for points of interest, road data (e.g., length, speed limit, drive time, etc.), and a database of maps.

The traveler may activate and use the point of interest finder via speech with the voice command platform. For example, the traveler could launch a point of interest finder application on their cellular telephone, automatically be connected with the voice command platform over the cellular wireless radio network infrastructure, and then in response to prompts enter route information by speaking the address of the destination, enter convenience criteria in response to voice prompts, and the type of point of interest. The navigation server takes the input criteria and searches the map database 218 for point of interest meeting the criteria, basically executing the search step 126 of FIG. 2. Search results could be provided to the traveler as speech (driving directions), or as data, e.g., text data, map data, or other form, e.g., as an email with driving directions in an attachment to an email retrieved via the traveler's cell phone or other wireless communications device (e.g., PDA, laptop computer).

In another possible embodiment, the traveler's cell phone could include a point of interest application that prompts the traveler to enter route data, convenience criteria, point of interest type and any other information and the application transmits such data to the navigation server 216. The server then executes the search step 126 against the database 218, returns points of interest meeting the search criteria, and prompts the traveler to select one of the resulting hits. The traveler makes a selection, and the navigation server returns with driving directions to the selected point of interest.

In one further embodiment, the traveler may receive the driving directions or address of the selected most convenient point of interest, and then port or download such directions or address to a local navigation aid and the navigation aid then modifies a route to include the point of interest. Such download could be by cable (e.g., USB) connection between the cell phone and the navigation aid, by means of WIFI or Bluetooth technology, or by any other means know known or later developed.

Thus, in this embodiment we have described a system 216/218 for providing driving instructions to a traveler using a cellular telephone 200 to direct the traveler to a most convenient point of interest while the traveler is traveling to a destination, comprising: a map database 218; and a navigation server 216 responsive to queries from the traveler for directions to a most convenient point of interest, the navigation server communicating with the traveler via a wireless communications network (202/204/206/208). The navigation server 216 comprises a data processing unit (not shown, but conventional) and a set of instructions comprising a most convenient point of interest routine 100 (FIG. 2) for execution by the data processing unit. The most convenient point of interest routine comprises instructions for:

(a) receiving one or more traveler-specified convenience criteria pertaining to a point of interest the traveler wishes to go to while traveling to the destination (steps 116, 118, 122 add possibly others);

(b) receiving a traveler-specified type of point of interest indicating the type of point of interest the traveler wishes to go to while traveling to the destination (step 124); and (c) searching through the map database for locations of points of interest of the type specified by the traveler meeting the traveler-specified convenience criteria (step 126).

The system further includes a means for providing driving directions to points of interest meeting the traveler-specified convenience criteria to the traveler. The means could include a text to speech converter 214 which provides driving directions in speech form to the traveler for receipt by the cell phone, or a network interface in the network server 216 which transmits a data packet to the cell phone 200 containing driving directions in text or map form for display on the cell phone. Such means may also include in one possible embodiment other communications equipment such as an email server for sending driving directions via email to the cell phone, an SMS server generating a SMS message to the cell phone, or any other type of communication device for communicating with the cell phone 200 in either text, data or voice format.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope. For example, in the situation where the traveler uses their cell phone to invoke the most convenient point of interest finder, the location of the traveler could be determined by means of GPS data transmitted from the cell phone to the network, in the situation where the cell phone includes GPS functionality. Alternatively, triangulation techniques applied to RF signals from the cell phone which are known in the art could be used to determine the location of the cell phone.

We claim:

1. A method of identifying a most convenient point of interest for a traveler traveling along a route to a destination, comprising the steps of:
   identifying a location of a cellular telephone of the traveler;
   receiving a traveler-specified type of point of interest indicating the type of point of interest the traveler wishes to go to while traveling to the destination;
   receiving from the cellular telephone via a wireless cellular network traveler-specified convenience criteria, wherein the traveler-specified convenience criteria comprises a maximum amount of desired time before the point of interest is reached;
   searching through a network server database containing points of interests and their locations for points of interest of the type specified by the traveler meeting the traveler-specified convenience criteria; and
   providing via the wireless cellular network to the cellular telephone of the traveler instructions to travel to at least one of the points of interest identified in the searching step if the searching step resulted in finding at least one point of interest meeting the convenience criteria.

2. The method of claim 1, wherein the method further comprises the step of providing a list of all points of interest of the type specified by the traveler meeting the traveler-specified convenience criteria and prompting the traveler to select one of the points of interest.

3. The method of claim 1, wherein the convenience criteria comprises the maximum desired travel distance off a previously determined route to the destination to reach the point of interest.

4. The method of claim 1, wherein in the event that the searching step does not identify any points of interest meeting the convenience criteria, performing the additional step of prompting the user to enter new convenience criteria.

5. The method of claim 1, wherein the method further comprises the step of:
   obtaining at least one of (a) the speed limit for road segments either on the route or for road segments off-route to points of interest, and (b) actual traffic flow rates for road segments either on the route or road segments off-route to the points of interest;
   using the speed limits and/or actual traffic flow rates to compute travel times from the current location of the traveler to points of interest in the database; and
   using the travel times to select a points of interest in the database meeting the convenience criteria.

6. The method of claim 1, wherein the convenience criteria comprises the soonest desired time to reach the point of interest.

7. The method of claim 1, wherein the convenience criteria comprises the maximum travel time off a previously determined route to the destination to reach the point of interest.

8. A navigation system providing driving directions to a traveler, comprising
   a map database containing points of interests and their locations;
   a data processing unit;
   a user interface for receiving input information from the traveler and providing a graphical and/or audible means for providing driving directions to the traveler;
   a means for determining the current location of a vehicle in which the navigation system is installed; and
   a set of instructions stored in memory in the navigation system comprising a most convenient point of interest routine for execution by the processor, wherein the most convenient point of interest routing comprises instructions for:
   receiving a traveler-specified type of point of interest indicating the type of point of interest the traveler wishes to go to while traveling to the destination; and
   receiving via the user interface one or more traveler-specified convenience criteria pertaining to a point of interest the traveler wishes to go to while traveling to a destination, wherein the convenience criteria comprises a soonest desired time to reach the point of interest;
   searching through the map database for locations of points of interest of the type specified by the traveler meeting the traveler-specified convenience criteria; and
   wherein the user interface provides driving directions graphically and/or audibly to the traveler providing instructions to the traveler to travel to at least one of the points of interest identified in the searching step if the searching step resulted in finding at least one point of interest in the database meeting the convenience criteria.

9. The navigation system of claim 8, wherein the instructions further comprise instructions for providing a list of all points of interest of the type specified by the traveler meeting the traveler-specified convenience criteria to the traveler via the user interface and prompting the traveler to select one of the points of interest, whereby the instructions provided to the traveler comprise instructions to travel to the selected point of interest.

10. The navigation system of claim 8, wherein the convenience criteria comprise at least one of: (a) the maximum desired travel distance off a previously determined route to the destination to reach the point of interest; (b) the maximum travel time off a previously determined route to the destination to reach the point of interest; (c) the maximum amount of desired time before the point of interest is reached; and (d) a landmark which must be passed before the point of interest is reached.

11. The navigation system of claim 8, wherein in the event that the searching step does not identify any points of interest meeting the convenience criteria, the instructions prompt the user to reenter new convenience criteria.

12. The navigation system of claim 8, wherein the map database further includes speed limit data for road segments on the route and for off-route road segments to points of interest, and wherein the searching instructions use the speed limit data to compute travel times from the current location of the traveler to points of interest in the database and use the travel times to select a points of interest in the database meeting the convenience criteria.

13. A system for providing driving instructions to a traveler using a cellular telephone to direct the traveler to a most convenient point of interest while the traveler is traveling to a destination, comprising:
   a map database; and a navigation server responsive to queries from the traveler for directions to a most convenient point of interest, the navigation server communicating with the traveler via a wireless communications network, wherein the navigation server comprises:

a data processing unit;

a set of instructions comprising a most convenient point of interest routine for execution by the data processing unit, wherein the most convenient point of interest routine comprises instructions for:

a) receiving a traveler-specified type of point of interest indicating the type of point of interest the traveler wishes to go to while traveling to the destination;

b) receiving one or more traveler-specified convenience criteria pertaining to a point of interest the traveler wishes to go to while traveling to the destination, wherein the traveler-specified convenience criteria comprises a maximum amount of desired time before the point of interest is reached;

c) searching through the map database for locations of points of interest of the type specified by the traveler meeting the traveler-specified convenience criteria, and a means for providing driving directions to a point of interest meeting the traveler-specified convenience criteria to the traveler.

14. The system of claim 13, wherein the instructions further comprise instructions for providing a list of all points of interest of the type specified by the traveler meeting the traveler-specified convenience criteria to the traveler and prompting the traveler to select one of the points of interest, whereby the driving directions provided to the traveler comprise instructions to travel to the selected point of interest.

15. The navigation system of claim 13, wherein the convenience criteria comprise at least one of: (a) the maximum desired travel distance off a previously determined route to the destination to reach the point of interest; (b) the soonest desired time to reach the point of interest; (c) the maximum travel time off a previously determined route to the destination to reach the point of interest; and (d) a landmark which must be passed before the point of interest is reached.

16. The navigation system of claim 13, wherein in the event that the searching step does not identify any points of interest meeting the convenience criteria, the instructions prompt the user to reenter new convenience criteria.

17. The navigation system of claim 13, wherein the map database further includes speed limit data for road segments on the route and for off-route road segments to points of interest, and wherein the searching instructions use the speed limit data to compute travel times from the current location of the traveler to points of interest in the map database and use the travel times to select a point of interest in the database meeting the convenience criteria.

18. The navigation system of claim 13, wherein the navigation system further comprises a speech generation engine for providing driving directions to the traveler in the form of speech.

19. The navigation system of claim 13, wherein the navigation system provides driving directions to the traveler in the form of text.

20. The navigation system of claim 13, wherein the navigation system provides driving directions to the traveler in the form of a map.

21. The navigation system of claim 13, wherein the navigation system obtains real-time traffic flow rate data for road segments either along the route or on off-route segments to the points of interest and uses such traffic flow rate data to compute travel times, and uses such travel times to select a most convenient point of interest meeting the convenience criteria.

* * * * *